United States Patent [19]
Schriver et al.

[11] Patent Number: 5,952,106
[45] Date of Patent: Sep. 14, 1999

[54] COATED NYLON FILM

[75] Inventors: Andrea K. Schriver, Orwigsburg, Pa.; James F. LaCanna, Freehold, N.J.; Stephen F. Yates, Arlington Heights, Ill.

[73] Assignee: AlliedSignal Inc., Morris Township, N.J.

[21] Appl. No.: 08/965,856

[22] Filed: Nov. 7, 1997

Related U.S. Application Data

[60] Provisional application No. 60/030,904, Nov. 14, 1996.

[51] Int. Cl.$^6$ .............................. B32B 27/34; B32B 27/40
[52] U.S. Cl. ...................... 428/423.5; 156/278; 264/134; 264/171.24; 264/288.4; 264/290.2; 428/425.1; 428/479.3; 428/479.6; 428/910
[58] Field of Search ................... 428/34.2, 34.3, 428/423.4, 423.5, 425.1, 479.3, 479.6, 910; 264/134, 171.24, 288.4, 290.2; 156/278

[56] References Cited

U.S. PATENT DOCUMENTS

| | | | |
|---|---|---|---|
| 3,300,370 | 1/1967 | Epstein et al. | 428/423.5 |
| 3,740,246 | 6/1973 | Kuga et al. | 427/393.5 |
| 3,870,684 | 3/1975 | Witt et al. | 524/591 |
| 4,686,125 | 8/1987 | Johnston et al. | 428/423.5 |
| 4,695,509 | 9/1987 | Cordova et al. | 442/60 |
| 5,354,807 | 10/1994 | Dochniak | 524/591 |
| 5,470,907 | 11/1995 | Wallon et al. | 524/507 |
| 5,475,050 | 12/1995 | Kawano et al. | 524/493 |
| 5,494,960 | 2/1996 | Rolando et al. | 524/591 |
| 5,532,058 | 7/1996 | Rolando et al. | 428/341 |

FOREIGN PATENT DOCUMENTS

| | | |
|---|---|---|
| 0254468 | 1/1988 | European Pat. Off. |
| 0490026 | 6/1992 | European Pat. Off. |
| 86-065394 | 3/1986 | Japan |
| 62-221539 | 9/1987 | Japan |
| 1-244847 | 9/1989 | Japan |
| 2-139234 | 5/1990 | Japan |
| 3-065274 | 3/1991 | Japan |
| WO 86/02655 | 5/1986 | WIPO |

*Primary Examiner*—D. S. Nakarani
*Attorney, Agent, or Firm*—Roger H. Criss

[57] ABSTRACT

A polyamide homopolymer or copolymer film which is coated with a transparent aqueous dispersion of a polyurethane and crosslinker, with subsequent crosslinking of the urethane. The coated film is preferably uniaxially or biaxially stretched. The resulting coated film has improved adhesion to biologically derived glues which find use in packaging and laminated articles such as paperboard structures which are then shaped into boxes for consumer use.

24 Claims, No Drawings

COATED NYLON FILM

CROSS-REFERENCE TO RELATED APPLICATION

This application claims the benefit of provisional application 60/030,904 filed Nov. 14, 1996 which is incorporated herein by reference.

BACKGROUND OF THE INVENTION

The present invention relates to coated nylon films. More particularly, the invention pertains to polyamide homopolymer or copolymer films which are coated with an aqueous dispersion of a polyurethane and a crosslinker, with subsequent crosslinking of the polyurethane. The coated film is preferably uniaxially or biaxially stretched either before or after coating. The resulting coated film has improved adhesion to biologically derived glues which find use in packaging and laminated articles such as paperboard structures which are then shaped into boxes for consumer use.

There is a significant need in a variety of industries for producing strong, durable, light weight multilayered paperboard or film laminates. Such laminates are used for producing packages for consumer products. It is desirable that these packages have a transparent nylon film layer since such a nylon layer has excellent strength and its lamination to printed paper or cardboard improves the appearance of the underlying paper or cardboard. In this use, a sheet of thin nylon film is laminated to a paper or cardboard surface by means of a suitable adhesive, thus generating a glossy, durable surface. Paper or cardboard which has been laminated in this way may be used for book covers, packaging material, boxes, and other applications. To be useful in such applications where appearance is important the nylon film must be transparent and defect-free, allowing the printed images on the paper or cardboard to be seen without distortion. It is also important that the moisture adsorption properties of nylon be unimpaired. Since nylon is moisture absorbent, it prevents curling of the laminate under the humidity conditions where the paper or cardboard also adsorbs moisture.

Packaging boxes are typically composed of one or more laminated paperboard or polymeric film sheets or objects which are held together by biologically derived glues such as animal glues. One disadvantage of using nylon laminated to cardboard for preparing decorative boxes is that the animal glue typically used to hold boxes together at the seams has poor adhesion to nylon. This weakness prevents such boxes from being used to package such heavy items as perfume or liquor bottles. Accordingly, it is desired to prepare a nylon film for use in laminating to printed paper or cardboard, which has improved adhesion to animal glues, but retains the transparency, good appearance, and moisture adsorption properties of the nylon film.

The invention provides a polyamide film having a transparent coating composition thereon comprising a water dispersion of a water dispersible polyurethane polymer and a crosslinker for the polyurethane. The aqueous dispersion is mixed with the crosslinking agent and then applied as a thin layer onto the nylon film. Water is dried from the composition and the polyurethane is cured with the crosslinking agent, usually by heating. The coated film is preferably uniaxially or biaxially stretched before or after applying the composition. Typically, a sheet of paperboard or other polymeric film substrate is adhered to the opposite side of the nylon film by use of a suitable adhesive, such as a polyethylene extrudate, and by the application of heat and/or pressure, to join the sheets into a laminated structure. The coating on the film is then contacted with a quantity of an animal glue and folded back onto itself into the desired box shape.

Water dispersions of polyurethanes and crosslinker are well known in the art. Likewise the application of certain such dispersions to polyamides is known. U.S. Pat. No. 5,354,807 shows an adhesive composition of a water dispersed polyurethane and a crosslinker. U.S. Pat. Nos. 5,532,058 and 5,494,960 teach a urethane dispersion containing a crosslinker such as aziridine which is applied to polyamide films to form a composite useful for packaging, however, such films are not stretched and therefore have less than desired strength. U.S. Pat. No. 3,300,370 teaches a polyamide article having a solid thermoplastic urethane elastomer on one surface. U.S. Pat. No. 3,870,684 teaches a urethane dispersion containing a crosslinker as a binder for paper. U.S. Pat. No. 4,695,509 teaches polyurethane composites having a crosslinker and a filler. U.S. Pat. No. 5,470,907 shows aqueous polyurethane dispersions useful for adhesives. U.S. Pat. No. 5,475,050 teaches aqueous polyurethanes containing silica. None of these teach or suggest a polyurethane dispersion containing a crosslinker such as aziridine which is on a stretched polyamide film and used to form a composite useful for high strength, transparent films for packaging and which have good adhesion to biologically derived adhesives.

Accordingly, the present invention prepares a composite by producing a layer of a coating composition comprising a polyurethane and a crosslinker on a stretched nylon film, thereby improving the adhesion of the nylon surface to animal glues without negatively affecting the transparency of the film. It is a particular advantage of this process that the coating may be applied to the nylon film prior to orientation, heated and stretched to provide this orientation, and still retain its properties of transparency, good appearance, and good adhesion to animal glue. Other ingredients may also be added to the formulation applied to the nylon film to improve other properties of the finished film, particularly including fine silica particles, which prevent the phenomenon known as blocking, and additives to improve flow and leveling.

DESCRIPTION OF THE INVENTION

The invention provides a coated film which comprises a polyamide film and a coating composition applied on the polyamide film, which coating composition comprises at least one water dispersible polyurethane and at least one crosslinker, which polyamide film is stretched either before or after the coating composition is applied on the polyamide film.

The invention also provides a coated film which comprises a polyamide film and a coating composition applied on the polyamide film, which coating composition comprises at least one water dispersible polyurethane; at least one crosslinker; and at least one component selected from the group consisting of fillers and surfactants.

The invention further provides a multilayered structure which comprises a polyamide film and a coating composition on one side of the polyamide film, which coating composition comprises at least one water dispersible polyurethane and at least one crosslinker; which polyamide film has been uniaxially or biaxially stretched after the coating composition has been applied on the film; a layer of a biologically derived glue on the coating composition; and a layer of paperboard or a polymeric substrate on an opposite side of the polyamide film.

The invention still further provides a method for preparing a coated film which comprises applying a coating composition onto one side of a polyamide film, which coating composition comprises at least one water dispersible polyurethane and at least one crosslinker; crosslinking the polyurethane; and uniaxially or biaxially stretching the film.

In the practice of the present invention, a composite is prepared which is composed of a polyamide film and a coating composition on the polyamide film. The coating composition comprises an aqueous dispersion of at least one polyurethane polymer and a crosslinker for the polyurethane polymer.

The polyamide layer may be comprised of polyamide homopolymer, copolymers or blends thereof Polyamides suitable for use in this invention include aliphatic polyamides, aromatic polyamides or aliphatic/aromatic polyamides. As used herein, "aliphatic polyamides" are polyamides characterized by the presence of recurring carbonamide groups as an integral part of the polymer chain which are separated from one another by at least two aliphatic carbon atoms. Illustrative of these polyamides are those having recurring monomeric units represented by the general formula:

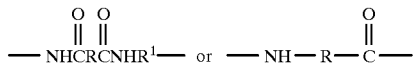

or a combination thereof in which R and $R^1$ are the same or different and are alkylene groups of at least about two carbon atoms, preferably alkylene groups having from about 2 to about 12 carbon atoms. As used herein, an "aliphatic/aromatic polyamide" is characterized by the presence of recurring carbonamide groups as an integral part of the polymer chain where the carbonyl moieties are separated by aliphatic moieties having at least two carbon atoms and where the nitrogen groups are separated by aromatic moieties. Illustrative of the aliphatic/aromatic polyamides are those having recurring units of the formula:

in which $R^2$ and $R^3$ are different and are alkylene groups having at least 2 carbon atoms, preferably having from 2 to about 12 carbon atoms, or arylene, preferably substituted or unsubstituted phenylene, alkylenephenylene or dialkylenephenylene and wherein the aliphatic moieties have from 1 to about 7 carbon atoms wherein permissible substituents are alkyl, alkoxy or halo, with the proviso that when $R^2$ is arylene, $R^3$ is alkylene and when $R^2$ is alkylene, $R^3$ is arylene or dialkylene phenylene.

Suitable aliphatic polyamides are polyamides formed by the reaction of diamines and diacids. Suitable examples of these polyamides include poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), lactams, poly(4-aminobutyric acid) (nylon 4), poly(6-aminohexanoic acid) (nylon 6, also known as poly(caprolactam)), poly(7-aminoheptanoic acid) (nylon 7), poly(8-aminoocatanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like. Blends of two or more aliphatic polyamides may also be employed.

Copolymers formed from recurring units of the above referenced aliphatic polyamides can be used in the fabrication of the polyamide layer. By means of illustration and not limitation, such, aliphatic polyamide copolymers include caprolactam/hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,2), hexamethylene adipamide/hexamethyleneazelaiamide/caprolactam copolymer (nylon 6,6/6,9/6) and the like.

Preferred polyamides for use in the practice of this invention are poly(caprolactam) and poly(hexamethylene adipamide), with poly(caprolactam) being the most preferred. Preferably the polyamide is substantially transparent.

Aliphatic polyamides used in the practice of this invention may be obtained from commercial sources or prepared in accordance with known preparatory techniques. For example, poly(caprolactam) can be obtained from Allied-Signal Inc., Morristown N.J. under the tradename CAPRON®. The number average molecular weight of the polyamide may vary widely. Usually the aliphatic polyamide is of a "film forming molecular weight", meaning a weight that is sufficiently high to form a free standing film but sufficiently low to allow melt processing of the blend into a film. Such number average molecular weights are well known to those of skill in the film forming art and are usually at least about 5,000 as determined by the formic acid viscosity (FAV) method (ASTM D-789). In this method, a solution of 11 grams of aliphatic polyamide in 100 ml of 90% formic acid at 25° C. is used. In the preferred embodiments of the invention, the number average molecular weight of the aliphatic polyamide ranges between about 5,000 to about 100,000, and in the particularly preferred embodiments it ranges between about 10,000 to about 60,000. Most preferred are those in which the number average molecular weight of the aliphatic polyamide is from about 20,000 to about 40,000.

Exemplary of aliphatic/aromatic polyamides are poly(hexamethylene isophthalamide), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), and the like. Blends of two or more aliphatic/aromatic polyamides can also be used. The most preferred aliphatic/aromatic polyamide is poly(m-xylyene adipamide).

Aliphatic/aromatic polyamides can be prepared by known preparative techniques or can be obtained from commercial sources. The number average molecular weight of the aliphatic/aromatic polyamide may vary widely. Usually, the aliphatic/aromatic polyamide is of a "film forming molecular weight", again meaning a weight that is sufficiently high to form a free standing film and sufficiently low to allow melt processing of the blend into a film. Such number average molecular weights are well known to those of skill in the film forming art and are usually at least about 5,000 as determined by the formic acid viscosity method described above. In the preferred embodiments of the invention, the number average molecular weight of the aliphatic/aromatic polyarnide is from about 5,000 to about 100,000, and in the particularly preferred embodiments is from about 10,000 to about 60,000. Most preferred are those in which the number average molecular weight of the aliphatic/aromatic polyamide is from about 20,000 to about 40,000. Preferably the polyamide is substantially transparent. Examples of aromatic polyamines nonexclusively include nylon MXD from Mitsubishi which is the reaction product of metaxylenediamine and adipic acid; and Selar PA from DuPont which is the reaction product of hexamethylenediamine and isophthalic and/or terephthalic acid.

Coated on at least one of the two sides of the polyamide layer is a coating composition comprising an aqueous polyurethane dispersion layer. The polyurethane layer comprises a blend of at least one polyurethane polymer and at least one crosslinker for the polyurethane in sufficient water to form a substantially uniform aqueous dispersion. Preferably the coating composition is substantially transparent.

The urethane polymer of this invention has the characteristics that it can be produced as a dispersion or suspension in water, that it can be crosslinked, and after crosslinking, it generates a durable, optically clear film. Urethanes are generally the product of reaction of a polyol component with an isocyanate component. Polyols are typically polyethers containing terminal hydroxyl groups, while isocyanates are typically aromatic or aliphatic polyisocyanates. The urethane polymer of this invention is composed of a polyol or mixture of polyols containing acidic functionality which will allow crosslinking, and an aliphatic diisocyanate. Examples of polyols which might be used to prepare the urethane polymer of this invention would include polyether polyols grafted with, for example, maleic or fumaric acid, as taught in U.S. Pat. Nos. 4,460,738 and 4,528,334, or mixtures of a polyol free of acid functionality with an acid-functional compound which also has hydroxyl, amine or thiol functionality. Examples of isocyanates which might be used to prepare the urethane polymer of this invention might include m-tetramethylxylene diisocyanate or p-tetramethylxylene diisocyanate. Urethane polymers of the type useful in the current invention are described in U.S. Pat. No. 5,494,960 which is incorporated herein by reference. The most preferred polyurethane is WD-4009 which is commercially available from H. B. Fuller Company of Vadnais Heights, Mn. This material is a urethane composed of a sterically hindered aromatic isocyanate and a polyether polyol containing a carboxylic acid functionality available for crosslinking. Infrared examination of this material shows evidence of OH, COOH and C=O functionality.

The weight percentage of the polyurethane in the coating composition ranges from at about 5% to about 50%, preferably from about 10% to about 20%, based on the weight of the coating composition including water.

The crosslinker of the current invention has the characteristics that it can be combined with an aqueous dispersion of the urethane polymer, that it will react with the polymer on drying, and that the resulting crosslinked film will be durable and optically clear. Such a crosslinker will typically be a chemical compound bearing at least three functional groups, preferably the same group, which will react with the acid functionality on the urethane polymer to generate a covalent bond. Examples of functional groups which will react with a carboxylic acid in this way include amines, hydroxyl groups, and thiol groups. The crosslinker must either be soluble in water, or easily dispersed in water. Preferred crosslinkers include melamine formaldehydes, isocyanates and aziridines. Suitable crosslinkers include trimethylolpropane tris[3-(2-methylaziridinyl)propanoate, which is sold under the trade names Ionac PFAZ 322 available commercially from Cybron Chemical, Inc. of Birmingham, N.J. and NeoCryl CX-100 available commercially from Zeneca Resins of Wilmington, Mass. Another effective crosslinker is the polymer generated by reaction of 1,3,5-triazine-2,4,6-triamine with formaldehyde, sold commercially as Cymel 350 or Cymel 385 available commercially from Cytec of West Paterson, N.J. The most preferred crosslinker is a compound containing at least two aziridine groups. The most preferred aziridine crosslinker is Hydroflex XR-2990 which is commercially available from H. B. Fuller Company of St. Paul, Minn. The weight percentage of the crosslinker in the coating composition ranges from at about 1% to about 10%, preferably from about 1.0% to about 3.0%, more preferably from about 1.5% to about 2.0% based on the weight of the coating composition including water.

The coating composition may contain additional ingredients such as fillers and surfactants. Non exclusive examples of suitable fillers include a wide variety of minerals, metals, metal oxides, siliceous materials, metal salts, and mixtures thereof These fillers may optionally be treated with various coupling agents or adhesion promoters, as is known to those skilled in the art. Examples of fillers included in these categories are silica, titanium dioxide, alumina, aluminum hydrates, feldspar, asbestos, talc, calcium carbonates, clay, carbon black, quartz, novaculite and other forms of silica such as kaolinite, bentonite, garnet, mica, saponite, beidelite, calcium oxide, calcium hydroxide, etc. The weight percentage of the filler in the coating composition ranges from at about 0.01% to about 0.12%, preferably from about 0.02% to about 0.08% based on the weight of the coating composition. The most preferred filler is silica. The preferred particle size of the filler ranges from about 12 nm to about 5 microns, preferably from about 12 nm to about 400 nm. Since optical transparency is important, these ranges should not be exceeded.

Suitable surfactants include anionic, cationic, nonionic, amphoteric and zwitterionic ts which are compatible with the other composition ingredients. Nonexclusive examples of such surfactants include anionic surfactants, for example, sulfated or sulfonated synthetic organic detergents. The useful sulf(on)ated detergents include the linear higher alkylbenzene sulfonates, olefin sulfonates and paraffin sulfonates, and higher fatty alcohol sulfates, higher fatty alcohol polyethoxylate sulfates (of 3 to 30 ethoxy groups, preferably 3 to 15), monoglyceride sulfates, and other commercially available sulf(on)ates of satisfactory surface activity and compatibility. Such products will normally contain a lipophilic moiety which includes a higher aliphatic group, of which groups the most preferred is higher linear alkyl. Such alkyl will normally be of 8 to 20 carbon atoms, preferably being of 10 to 18 carbon atoms, e.g., lauryl, myristyl, and cetyl.

Nonionic synthetic organic detergents optionally employed in the practice of the invention may be any of a wide variety of such compounds which are well known in the art. Suitable nonionic surfactants are poly-lower alkoxylated lipophiles wherein the desired hydrophile-lipophile balance is obtained from addition of a hydrophilic poly-lower alkoxy group to a lipophilic moiety. A preferred class of the nonionic detergent employed is the poly-lower alkoxylated higher alkanol wherein the alkanol is of 10 to 18 carbon atoms and wherein the number of mols of lower alkylene oxide (of 2 or 3 carbon atoms) is from 3 to 12.

Other anionic, cationic, nonionic, amphoteric and zwitterionic surfactants are described at length in the text Surface Active Agents, Vol. II, by Schwartz, Perry and Berch, published in 1958 by Interscience Publishers and in McCutcheon's Detergents and Emulsifiers, 1969 Annual, the relevant disclosures of which are hereby incorporated by reference. Suitable surfactants are commercially available as propylene glycol (Sigma), Triton GR5M (Union Carbide), Additive #14 (Dow Corning), Surfynol 104 (Air Products), Fluorad series of surfactants (3M). The weight percentage of the surfactant in the coating composition ranges from at about 0.05% to about 2%, preferably from about 0.1% to about 1%, based on the weight of the coating composition.

The coating compositions can be made in any conventional manner such as by blending the polyurethane with sufficient water to form a dispersion, adding the crosslinker and adding the optional filler and surfactant to a vessel with vigorous spring, for example for from about 15 to about 20 minutes.

The aqueous dispersion of urethane polymer, crosslinker, and optionally other components may be applied to the nylon film by any of several methods known to those skilled in the art. It is essential that this coating be smooth such that after curing no gaps, scratches or other optical defects are present. For example, the coating composition may be applied to the polyamide film by knife coating, coating with a Meyer rod, gravure coating, forward and reverse roll coating, die coating, spraying, doctoring, brushing, dipping, meniscus coating or air knife techniques which are well known in the art. It will be understood by those skilled in the art that the optimum concentration of polymeric components in the aqueous dispersion will vary depending on the coating method used. A coating method which applies a relatively large amount of dispersion to the substrate will allow lower concentrations of polymer to be used, while coating methods which apply relatively little dispersion may either require multiple coats, or the use of a relatively concentrated dispersion.

After the coating composition has been applied to the polyamide film, the coating should be dried to remove the water, and allow the crosslinking reaction to occur. Typically, in a commercial operation, the coating operation will operate continuously on a sheet of film passing through the coater, and this coated film will then pass into an oven. Any type of oven, convection or infrared, for example, could be used to dry the coating. The oven temperature required to dry the coating will depend on the amount of liquid to be removed, as well as the size of the oven and the line speed with which the film passes through the oven; shorter times require higher temperatures. In the preferred embodiment, the temperature ranges from about 435° C. to about 490° C., more preferably, the temperature ranges from about 450° C. to about 460° C. The dwell time at such temperature preferably ranges from about 1 second to about 10 seconds, more preferably from about 3 seconds to about 7 seconds.

Any crosslinking method known to those skilled in the art may be used, however, heating is preferred in order to effect a crosslinking of the polyurethane by the crosslinker. Heating may be done in conventional ovens, circulating ovens, or be done by infrared radiation or by heat lamps. The coating composition may be applied to the polyamide film before or after optional stretching. The preferred coating weight of the dried coating composition on the polyamide film ranges from about 0.02 g/m$^2$ to about 2.0 g/m$^2$ and more preferably preferably ranges from about 0.065 g/m$^2$ to about 0.3 g/m$^2$. While such coating weight are preferred, it is to be understood that other film coating weight may be produced to satisfy a particular need and yet fall within the scope of the present invention.

It is particularly beneficial if, after the film has been coated and dried, it is then uniaxially or biaxially stretched or oriented by a means well known in the art. It should be noted that this places severe demands on the coating, since a coating which was applied before orientation may be required to stretch several fold in surface area during orientation. During this process, the coating must retain integrity, and remain smooth and optically clear with no defects. The film may be stretched uniaxially in either the direction coincident with the direction of movement of the film being withdrawn from the film forming apparatus, also referred to in the art as the "machine direction", or in a direction which is perpendicular to the machine direction, and referred to in the art as the "transverse direction", or biaxially in both the machine direction and the transverse direction. The films of the present invention have sufficient dimensional stability to be stretched at least 1.5 and preferably more than three times and more preferably from more than three times to about ten times in either the machine direction or the transverse direction or both. Typically for use in the present invention, the oriented film formed from the composition of the invention are preferably produced at draw ratios of from about 1.5:1 to about 6:1, and preferably at a draw ratio of from about 3:1 to about 4:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film. The biaxial orientation process can be either simultaneous or sequential. In the orientation process, the film is typically heated at temperatures of from about 200° C. to about 230° C. for a period of from about 10 to about 20 seconds.

The preferred thickness of the oriented polyamide film ranges from about 0.3 mils (7.6 $\mu$m) to about 5.0 mils (127.0 $\mu$m) and preferably from about 0.5 mils (12.7 $\mu$m) to about 1.5 mils (37.5 $\mu$m). While such thicknesses are preferred as providing a readily flexible film, it is to be understood that other film thicknesses may be produced to satisfy a particular need and yet fall within the scope of the present invention.

In its intended use, the coated film will be laminated to the printed face of a sheet of paper or cardboard with the coated side facing away from the paper or cardboard surface. Any laminating adhesive and/or process known to those skilled in the art may be used to accomplish this lamination. The laminated paper or cardboard sheet may then be formed or folded into the desired shape, with a suitable overlap to supply the seam to be glued.

In order to produce a multilayered structure, the coating composition side of the polyamide film is adhered to a biologically derived glue such as animal glue, fish glue or vegetable glue as are well known in the art. Animal glues, including mammal glues are preferred. Animal glue is typically applied hot, after melting, and then allowed to cool. The two surfaces which are to be glued to each other must be held against each other during this cooling process. Aninal glues are typically a colloidal mixture usually prepared from proteinaceous material. Such includes hide glues which are prepared from hydrolysis of collagen, the protein of cattle hides, connective tissue, blood and bones. Bone glues are made from the bones of cattle by steam hydrolysis extraction. Bones are repeatedly extracted and dilute glue solutions are filtered to remove fats and evaporated to a desired solids content, and dried. Fish glues are obtained from the skin of fishes, such as codfish. Since fish collagen breaks down more readily than cattle collagen, the protein has a lower molecular weight, i.e. than that of animals (30,000–60,000 as compared to 25,000–250,000 for hide glues). Casein glues are made from the protein of milk after treatment with calcium hydroxide. They are often formulated with crosslinking agents, such as formaldehyde or dialdehyde starch to enhance their adhesive strength. Soybean protein can be hydrolyzed into a vegetable glue by alkaline treatment. Likewise casein glues, are often formulated with formaldehyde, hexamethylenetetramine, and related crosslinking agents. Such biologically derived glues are well known in the art.

Multilayer structures can be produced by attaching a layer of paperboard or a polymeric substrate onto the opposite side of the side of the polyamide film, i.e. the side of the polyamide film without the polyurethane composition. One method of attachment is by lamination whereby a multilayer structure is formed from pre-fabricated film plies by methods which are well known in the art. Typically, laminating is done by first extrusion coating the nylon film (non-coated side) with an adhesive such as polyethylene. Then the polyethylene side of the film is laminated to the paperboard under conditions of sufficient heat and pressure to cause the layers to adhere. Typically the polyamide and substrate are positioned on one another with the substrate on the opposite side of the polyamide film, and the combination is passed through the nip of a pair of heated laminating rollers by techniques well known in the art. Lamination heating may be done at 5 temperatures ranging from about 75° C. to about 175° C., at pressures ranging from about 5 psig (0.034 MPa) to about 100 psig (0.69 MPa) for from about 5 seconds to about 5 minutes, preferably from about 30 seconds to about 1 minute. Optionally additional layers of substrate are alternately adhered to the prior substrate to form a multi-tiered article. The composites produced according to the present invention are found to have low cost, excellent peel strength, vapor blocking and adhesion to biologically derived glues.

The following non-limiting examples serve to illustrate the invention.

EXAMPLE 1

In a small beaker, 19.67 g of Hydroflex WD-4009 polyurethane dispersion (available from H. B. Fuller) was mixed with 0.33 g of Hydroflex XR-2990, a polyfunctional aziridine crosslinker (available from H. B. Fuller), and stirred. This formulation was then coated onto a sheet of biaxially oriented nylon-6 film using a Meyer 0 rod, and cured in a convection oven at 85–90° C. for 5 minutes. The finished film sample was tested as described in Examples 2 and 3. The results are shown in Table 1.

EXAMPLE 2
PROCEDURE FOR MEASURING PEEL STRENGTH

A supply of animal glue (NW80C, supplied by L. D. Davis Industries) was melted in an oven set at ca. 100° C. A sheet of light smooth cardboard, 3 inches by 6 inches, was lightly coated with this glue, using a small block of wood as an applicator. Then a sheet of the nylon film to be tested was placed on the glue surface, treated surface down, and the resulting sandwich was removed from the oven. A 2 kg cylinder was rolled twice across the sandwich to press the film against the glued cardboard. The sandwich was allowed to cool. Then two rectangles one inch wide by 6 inches long were cut from the sample.

The rectangular samples were taped at one end to a steel plate, and the cardboard and steel plate were held together at the other end by one clamp of an Instron tester. A strong piece of tape was applied to the exposed side of the nylon film, and the other clamp of the Instron unit was used to grasp the film and the tape. The 180° peel strength of the film to the glued surface was measured by pulling the film away from the cardboard at a 180° angle and measuring the force required to do this.

The peel strength for an individual sample was taken to be the average force required over that portion of the stress/strain curve which was essentially flat. The values reported in all the Tables below are the average of three individual sample strengths.

EXAMPLE 3
PROCEDURE FOR THE BOX TEST

An 8 inch by 10 inch piece of light cardboard was laminated to a sheet of the nylon film to be tested using an adhesive. The film was laminated in such a way that the treated surface of the film remained exposed. This nylon/cardboard laminated sheet was then folded into a square tube in such a way that 0.75 inches of an overlap tab was left. The cardboard side of this tab was then coated lightly with animal glue (NW80C, supplied by L. D. Davis Industries), and pressed against the nylon side of the tube to complete the assembly of the test tube. This tube was allowed to stand at room temperature for 24 hours, and then heated in an oven at 50° C. for three days. The tube was then removed from the oven and allowed to cool.

Tubes were tested by squeezing them and flexing them to stress the glued join. Tubes which popped open after only 1–2 flexes were graded as "Fail". Tubes which required repeated and forceful flexing to come apart were graded as "Marginal". Tubes which survived repeated flexing, and which, when pulled apart at the seam came apart at the glue/cardboard interface or due to cohesive failure of the cardboard were graded as "Pass".

COMPARATIVE EXAMPLE 4

In a small beaker, 64.63 g of Rhoplex WL-92 acrylic polymer (available from Rohm & Haas, Philadelphia, Pa.) was mixed with 16.6 g of water, 16.58 g of butyl cellosolve, 2.69 g of butylcarbitol, and 2.22 g of dibutyl phthalate, and stirred. This formulation was then coated onto a sheet of biaxially oriented nylon-6 film using a Meyer 0 rod, and cured in a convection oven at 85–90° C. for 5 minutes. The finished film sample was tested as described in Examples 2 and 3. The results are shown in Table 1.

COMPARATIVE EXAMPLE 5

In a small beaker, 65.43 g of Rhoplex WL-51 acrylic polymer (Product of Rohm & Haas) was mixed with 16.54 g of water, 1.32 g of butyl cellosolve, 0.29 g of butylcarbitol, and 0.22 g of dibutyl phthalate, and stirred. Ammonia was then added until the pH of the mixture reached 8.38. This formulation was then coated onto a sheet of biaxially oriented nylon-6 film using a Meyer 0 rod, and cured in a convection oven at 85–90° C. for 5 minutes. The finished film sample was tested as described in Examples 2 and 3. The results are shown in Table 1.

COMPARATIVE EXAMPLE 6

An aliquot of Rhoplex HA-16, nonionic acrylic polymer emulsion (Product of Rohm & Haas, used as received) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 7

An aliquot of Rhoplex HA-16 (Product of Rohm & Haas, diluted to 5% concentration with water) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 8

An aliquot of Hycar 26448, acrylic polymer emulsion (Product of B. F Goodrich, Brecksville, Ohio) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 9

In a small beaker, 100 g of Carboset CR 780 acrylic polymer Product of B. F. Goodrich) was mixed with 3.20 g of Cymel 385 (Product of Cytec), and stirred. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 10

In a small beaker, 100 g of Carboset CR 780 was mixed with 3.2 g of Cymel 385 crosslinker, and stirred. The product was then diluted with water to a final concentration of 5%. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 11

In a small beaker, 100 g of Rhoplex E-1018 acrylic polymer (Product of Rohm & Haas) was mixed with 3.84 g of Cymel 385, and stirred. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 12

In a small beaker, 100 g of Rhoplex E-1018 acylic polymer (Product of Rohm & Haas) was mixed with 3.84 g of Cymel 385, and stirred. The product was then diluted with water to a final concentration of 5%. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 13

An aliquot of Hycar 2671, acrylic polymer emulsion (Product of B. F. Goodrich), was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 14

An aliquot of Hycar 2671, diluted to 5% with water) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 15

An aliquot of Rhoplex AC-261, anionic acrylic copolymer (Product of Rohm & Haas) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 16

In a small beaker, 100 g of Rhoplex AC-261 was mixed with 4.0 g of Cymel 385, and stirred. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 17

In a small beaker, 100 g of Rhoplex AC-261 was mixed with 4.0 g of Cymel 385, and stirred. The resulting mixture was diluted to 5% concentration with water. This formulation was then coated onto a sheet of biaxially oriented nylon-6 film using a Meyer 2.5 rod, and cured in a convection oven at 85–90° C. for 3 minutes. The finished film sample was tested as described in Example 2. The results are shown in Table 1.

COMPARATIVE EXAMPLE 18

An aliquot of Rhoplex AC-604 was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 19

An aliquot of Michem 4990R an ethylene acrylic acid dispersion (Product of Michelmann, Inc., Cincinnatti, Ohio) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 20

An aliquot of Michem 4983R (Product of Michelman Inc.) was coated onto a sheet of biaxially oriented nylon-6 film using a Meyer 0 rod, and cured in a convection oven at 85–90° C. for 5 minutes. The finished film sample was tested as described in Example 2. The results are shown in Table 1.

COMPARATIVE EXAMPLE 21

An aliquot of Neocryl XA5090, acrylic copolymer, (Product of Zeneca Resins, Wilmington, Mass.) was coated onto a sheet of biaxially oriented nylon-6 film using a Meyer 2.5 rod, and cured in a convection oven at 85–90° C. for 5 minutes. The finished film sample was tested as described in Example 2. The results are shown in Table 1.

COMPARATIVE EXAMPLE 22

An aliquot of Neocryl XA5090 (Product of Zeneca Resins) was coated onto a sheet of biaxially oriented nylon-6 film using a 180 Anilox roller, and cured in a convection oven at 85–90° C. for 5 minutes. The finished film sample was tested as described in Example 2. The results are shown in Table 1.

TABLE 1

RESULTS OF SCREENING STUDIES FOR COATING FORMULATIONS

| EX-AM-PLE | COATING | PEEL TEST AVERAGE (LBS/IN) | BOX TEST* |
|---|---|---|---|
| 1 | Hydroflex WD-4009 & XR-2990 | 0.78 | Pass, Pass |
| 4 | Rhoplex WL-92 | 0.613 | Marginal, Marginal |
| 5 | Rhoplex WL-51 | 0.063 | Pass, Fail, Fail |
| 6 | Rhoplex HA-16 | 0.0485 | |
| 7 | Rhoplex HA-16 | 0.0285 | |
| 8 | Hycar 26448 (straight) | 0.1825 | |
| 9 | Carboset CR780 & Cymel 385 | 0.1625 | |
| 10 | Carboset CR780 & Cymel 385 | 0.0515 | |
| 11 | Rhoplex E-1018 & Cymel 385 | 0.1265 | |
| 12 | Rhoplex E-1018 & Cymel 385 | 0.0765 | |
| 13 | Hycar 2671 | 0.428 | |
| 14 | Hycar 2671 | 0.1495 | |
| 15 | Rhoplex AC-261 | 0.0195 | |
| 16 | Rhoplex AC-261 & Cymel 385 | 0.0205 | |
| 17 | Rhoplex AC-261 & Cymel 385 | 0.026 | |
| 18 | Rhoplex AC-604 | 0.23 | |
| 19 | Michem 4990R | 0.3525 | |
| 20 | Michem 4983R | 0.1415 | |
| 21 | Neocryl XA5090 | 0.51 | |
| 22 | Neocryl XA5090 | 0.091 | |

*Multiple entries indicate that the test was repeated.
From this series of screening experiments, it was determined that the polyurethane formulation produced the best adhesion results of all materials tested. Coatings based on a variety of formulations of acrylic polymers, copolymers, and ethylene acrylic acids did not produce the desired bond strengths between the nylon and the animal glue.

EXAMPLE 23
EFFECT OF COAT WEIGHT

Samples of Hydroflex WD4009 (H. B. Fuller) were mixed Hydroflex XR-2990, such that the final concentration of the latter was 2.0%, and stirred. The overall concentration of this formulation was adjusted to the final concentrations shown in Table 2. This formulation was then coated onto a sheet of biaxially oriented nylon-6 film using a commercial continuous coater at the speeds shown in Table 2. The finished film sample was tested as described in Examples 2 and 3. The coat weight of the coating which had been applied was also measured by inserting a pre-weighed sheet of aluminum foil into the coater, attached to the moving film, recovering this foil before stretching, and measuring its change in weight. As Table 2 clearly indicates, increasing the coat weight of the urethane coating improves the adhesion results according to both standard tests.

TABLE 2

EFFECT OF COAT WEIGHT

| Coating (Hydroflex WD-4009 & 2.0% XR-2990) | Peel Test Average (lbs/in) | Box Test |
|---|---|---|
| 1.0–1.2 lbs/ream before draw | 0.032 | |
| 1.0–1.2 lbs/ream before draw | 0.029 | fail |
| 1.0–1.2 lbs/ream before draw | 0.041 | |
| 1.5 lbs/ream before draw | 0.045 | |
| 1.5 lbs/ream before draw | 0.050 | fail |
| 1.5 lbs/ream before draw | 0.045 | |

TABLE 2-continued

EFFECT OF COAT WEIGHT

| Coating (Hydroflex WD-4009 & 2.0% XR-2990) | Peel Test Average (lbs/in) | Box Test |
|---|---|---|
| 1.8 lbs/ream before draw | 0.054 | |
| 1.8 lbs/ream before draw | 0.111 | marginal + |
| 1.8 lbs/ream before draw | 0.123 | |

One ream = 3,000 square feet.

EXAMPLE 24

EFFECT OF CROSSLINKER TYPE AND CONCENTRATION

In a series of small beakers, Hydroflex WD4009 (H. B. Fuller) was mixed with either Hydroflex XR-2990 or Cymel 385 to the concentrations noted in Table 3 and stirred. This formulation was then coated onto a sheet of biaxially oriented nylon-6 film using a Meyer 3 rod, and cured in a convection oven at 150° C. for 1.5 minutes. The finished film samples were tested as described in Examples 2 and 3. The results are shown in Table 3. Note that a modest increase in peel strength was observed as the concentration of Hydroflex XR-2990 was increased. With the Cymel 385 crosslinker, best results were obtained at the lowest crosslinker concentration.

TABLE 3

EFFECT OF CROSSLINKER IDENTITY AND CONCENTRATION

| Description | Ave. Mean Peel Strength (lbs/in) | Box Test | |
|---|---|---|---|
| Fuller WD-4009 with 0.75% XR-2990 | 0.711 | pass | |
| Fuller WD-4009 with 3% XR-2990 | 0.879 | pass | |
| Fuller WD-4009 with 0.75% Cymel 385 | 0.633 | pass | |
| Fuller WD-4009 with 1.5% Cymel 385 | 0.665 | pass | |
| Fuller WD-4009 with 1.5% Cymel 385 | 0.516 | marg. | pass |
| Fuller WD-4009 with 3% Cymel 385 | 0.417 | pass | |
| Fuller WD-4009 with 3% Cymel 385 | 0.503 | pass | pass |
| Fuller WD-4009 with 9% Cymel 385 | 0.180 | marg. | fail |

EXAMPLE 25

EFFECT OF ADDING SILICA ANTIBLOCK TO A 25% TOTAL SOLIDS FORMULATION

In a series of small beakers, approximately 24.5 g Hydroflex WD-4009 polyurethane (H. B. Fuller) was mixed with approximately 0.39 g Hydroflex XR-2990 crosslinker, approximately 2 g of water and various amounts of Aerosil 200 silica to the concentrations noted in Table 4 and stirred. This formulation was then coated onto a sheet of biaxially oriented nylon-6 film using a Meyer 3 rod, and cured in a convection oven at 150° C. for 1.5 minutes. The finished film samples were tested as described in Examples 2 and 3. The results are shown in Table 4. Note that all samples showed acceptable performance, though the largest concentration of silica degraded performance slightly.

TABLE 4

EFFECT OF ADDING SILICA ANTIBLOCK TO A 25% TOTAL SOLIDS FORMULATION

| Description | Ave. Mean Peel Strength (lbs/in) | Box Test |
|---|---|---|
| Fuller 4009, 2.0% 2990 (25% solids) | 0.966 | pass |
| Fuller 4009, 2.0% 2990, 0.02% silica (25% solids) | 0.905 | pass |
| Fuller 4009, 2.0% 2990, 0.04% silica (25% solids) | 1.286 | pass |
| Fuller 4009, 2.0% 2990, 0.08% silica (25% solids) | 0.807 | pass |

EXAMPLE 26

EFFECT OF ADDING SILICA ANTIBLOCK TO A 34% TOTAL SOLIDS FORMULATION

In a series of small beakers, approximately 24.5 g Hydroflex WD-4009 (H. B. Fuller) was mixed with approximately 0.39 g Hydroflex XR-2990, and various amounts of Aerosil 200 silica to the concentrations noted in Table 5 and stirred. This formulation was then coated onto a sheet of biaxially oriented nylon-6 film using a Meyer 3 rod, and cured in a convection oven at 150° C. for 1.5 minutes. The finished film samples were tested as described in Examples 2 and 3. The results 15 are shown in Table 5. Note that all samples showed acceptable performance, though the largest concentration of silica degraded performance slightly.

TABLE 5

EFFECT OF ADDING SILICA ANTIBLOCK AT A 34% TOTAL SOLIDS FORMULATION

| Description | Ave. Mean Peel Strength (lbs/in) | Box Test | |
|---|---|---|---|
| Fuller 4009/2.0% 2990 (34% solids) | 0.694 | pass | pass |
| Fuller 4009/2.0% 2990/0.02% silica (34% solids) | 0.589 | pass | pass |
| Fuller 4009/2.0% 2990/0.04% silica (34% solids) | 0.793 | marg. | pass |
| Fuller 4009/2.0% 2990/0.08% silica (34% solids) | 0.551 | marg. | pass |

EXAMPLE 27

COATING PRIOR TO ORIENTATION

Samples of Hydroflex WD4009 (H. B. Fuller) were mixed with Hydroflex XR-2990, such that the final concentration of the latter was 1.5%, and stirred. This formulation was then coated onto a sheet of cast nylon-6 film using a gravure coater. The coating weight was 0.81 g/m² (0.5 lbs/ream). After drying, the cast film was biaxially oriented by stretching in two dimensions to 2.5 times the original dimensions using a laboratory scale T.M. Lang stretcher. The temperatures used during orientation are shown in Table 6. The finished film sample was tested as described in Examples 2 and 3. The results are shown in Table 6. From these data it is concluded that in this orientation experiment, adhesion is enhanced beyond the proportional relationship to coat weight. The temperature during the stretch is not a significant variable for adhesion. The measured coat weight before stretch was 0.81 g/m² (0.5 lbs/ream). The calculated coat weight after stretch was 0.13 g/m² (0.08 lbs/ream)

TABLE 6

EFFECT OF ORIENTATION OF THE NYLON FILM AFTER COATING

| Description | Ave. Mean Peel Strength (lbs/in) | Box Test |
|---|---|---|
| WD 4009, 1.5% XR-2990, stretched at 270 F. | 1.527 | marg. |
| WD 4009, 1.5% XR-2990, stretched at 220 F. | 1.645 | marg. |

EXAMPLE 28

EFFECT OF COAT WEIGHT ON ADHESION

A series of formulations were developed to lay down various levels of coat weights and measure differences in adhesion performance. The amounts of the urethane component, the polyfunctional aziridine, and the silica were altered while maintaining the 2 wt % crosslinker to latex ratio and a 0.1 wt % silica to total batch ratio.

This mixture was applied to a polyamide film by a smooth applicator roll and the excess removed by force of air pressure blowing at a constant and controlled angle and rate over the surface of the film. The coated film was dried by an infrared oven to a tacky surface. Most of the water is removed in this drying process to begin the cure process, however, the remainder is removed during the heating and orientation process and cure is not complete for 24 hours. The coat weight is measured at this stage by weighing aluminum foil squares of specific dimensions before and after coating has been applied and dried. The biaxial orientation process in this example is simultaneous approximately 3 in.×3 in. transverse and longitudinal directions. The film is then heat set under tension and then cooled before winding. Prior to winding, the coated film surface is also corona treated. The resulting coating is smooth and continuous, and reduced in thickness by a factor of approximately nine times the amount applied before stretch. The coat weight recorded in Table 7 is the final coat weight, which is an extrapolation of coat weight measure before orientation. From these data it is concluded that the adhesion of the coated nylon film to the animal glue increases with increasing coating weight.

TABLE 7

EFFECT OF COAT WEIGHT ON ADHESION

| Coat Weight | | |
|---|---|---|
| (lbs/ream) | g/m² | Peel Strength (lbs/in) |
| .160 | .260 | .134 |
| .093 | .151 | .063 |
| .052 | .080 | .038 |

EXAMPLE 29

In another experiment, the type of crosslinker was evaluated for adhesion performance. Several formulations were prepared, each having the optimized level of crosslinker type (polyfunctional aziridine (PFA) XR2990 vs. melamine formaldehyde (MF) Cymel 385) to determine the level of adhesion performance. The formulations were prepared in the same manner as described above, and applied by the above method. From these data it is concluded that the PFA crosslinker provides a stringer bond to the animal glue than the MF crosslinker.

17

TABLE 8

| Crosslinker | Coat weight (lbs/ream) | | Peel strength (lbs/in) |
| --- | --- | --- | --- |
| | (lbs/ream) | (g/m²) | |
| PFA | .160 | .260 | .134 |
| PFA | .093 | .151 | .063 |
| MF | .108 | .176 | .043 |

EXAMPLE 30

Example 1 is repeated except 1% by weight of an anionic surfactant is added. A smooth level layer is produced on the nylon film.

EXAMPLE 31
COATING PRIOR TO ORIENTATION

One hundred grams of Hydroflex WD4900 (H. B. Fuller) were mixed with two grams of Hydroflex XR-2900 and stirred. This formulation was drawn down on a cast nylon-6 film using a #7 mayer rod. The coat weight was measured using preweighed aluminum foil squares at 3.0 lbs/ream. The film was then drawn 2.5 times in the machine direction by 2.5 times in the transverse direction simultaneously using a lab-scale T. M. Long stretcher. The calculated final coat weight was 0.5 lbs/ream. The average peel strength values are shown in Table 9.

Separately, one hundred grams of Hydroflex WD4009 and two grams of Hydroflex XR-2990 were combined with 135 grams water and stirred. This formulation was drawn down on a cast nylon-6 film using a #2.5 mayer rod. The coat weight was measured as in the above-described method to be 0.5 lbs/ream. The average peel strength values are shown in Table 9.

TABLE 9

| Description | Final Coat Weight | | Ave. Peel Strength |
| --- | --- | --- | --- |
| | (lbs/ream) | (g/m²) | (lbs/in) |
| Coated, Drawn (2.5 × 2.5) | .5 | .82 | .232 |
| Coated, Undrawn | .5 | .82 | .110 |

From these data, it is concluded that the orientation process, i.e. orienting coated film, provides enhanced adhesion benefits (two times the level of unoriented in this example) vs. coating without subsequent orientation.

What is claimed is:

1. A coated film which comprises a polymide film and a substantially uniform crosslinked polyurethane coating on the polyamide film, the crosslinked polyurethane coating formed with a coating composition comprising at least one water dispersible polyurethane, and at least one crosslinker, and a layer of a biologically derived glue on the crosslinked polyurethane coating, wherein the polyamide film is stretched either before or after the coating composition is applied on the polymide film.

2. The coated film of claim 1 wherein the polyamide film has been uniaxially or biaxially stretched after the coating composition has been applied on the film.

3. The coated film of claim 1 wherein the polyamide film has been uniaxially or biaxially stretched before the coating composition has been applied on the film.

4. The coated film of claim 1 wherein the polyurethane coating is substantially transparent.

5. The coated film according to claim 1 wherein the polyamide film comprises a polyamide homopolymer, copolymer or blends thereof.

18

6. The coated film according to claim 1 wherein the polyamide film comprises a polyamide selected from the group consisting of those having recurring monomeric units represented by the general formula:

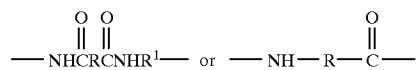

or a combination thereof in which R and $R^1$ are the same or different and are alkylene groups of at least about two carbon atoms, and aliphatic/aromatic polyamides having recurring units of the formula:

in which $R^2$ and $R^3$ are different and are alkylene groups having at least 2 carbon atoms, or arylene wherein the aliphatic moieties have from 1 to about 7 carbon atoms wherein permissible substituents are alkyl, alkoxy or halo, with the proviso that when $R^2$ is arylene, $R^3$ is alkylene and when $R^2$ is alkylene, $R^3$ is arylene or dialkylene phenylene.

7. The coated film according to claim 1 wherein the polyamide film comprises a polyamide selected from the group consisting of poly(hexamethylene adipamide), poly(hexamethylene sebacamide), poly(heptamethylene pimelamide), poly(octamethylene suberamide), poly(hexamethylene azelamide), poly(nonamethylene azelamide), poly(decamethylene azelamide), poly(4-aminobutyric acid), poly(6-aminohexanoic acid) poly(7-aminoheptanoic acid), poly(8-aminoocatanoic acid), poly(9-aminononanoic acid), poly(10-aminodecanoic acid), poly(11-ammoundecanoic acid), poly(12-aminododecanoic acid, caprolactam/hexamethylene adipamide copolymer, hexamethylene adipamide/caprolactam copolymer, trimethylene adipamide/hexamethylene azelaiamide copolymer, hexamethylene adipamide/hexamethyleneazelaiamide/caprolactam copolymer, poly(caprolactam), poly(hexamethylene adipamide), poly(hexamethylene isophthalamide), poly(2,2,2-trimethyl hexamethylene terephthalamide), poly(m-xylylene adipamide), poly(p-xylylene adipamide), poly(hexamethylene terephthalamide), poly(dodecamethylene terephthalamide) and mixtures thereof.

8. The coated film according to claim 1 wherein the number average molecular weight of the polyamide ranges from about 5,000 to about 100,000.

9. The coated film according to claim 1 wherein the polyamide film is substantially transparent.

10. The coated film according to claim 1 wherein the polyurethane comprises the reaction product of a sterically hindered aromatic isocyanate, and a polyether polyol containing crosslinkable carboxylic acid functionality and the crosslinker has hydroxyl or amino groups.

11. The coated film according to claim 1 wherein the at least one crosslinker comprises a melamine formaldehyde oligomer.

12. The coated film according to claim 1 wherein the at least one crosslinker comprises a compound containing at least two aziridine groups.

13. The coated film according to claim 1 wherein the coating composition further comprising at least one filler.

14. The coated film according to claim 13 wherein the filler comprises silica.

15. The coated film according to claim 1 wherein the coating composition further comprises at least one surfactant.

16. The coated film according to claim 15 wherein the surfactant is selected from the group consisting of anionic surfactants, cationic surfactants, nonionic surfactants, amphoteric surfactants, zwitterionic surfactants and mixtures thereof.

17. The coated film according to claim 1 wherein the film has been biaxially stretched from about 1.5 times to about 4 times in a longitudinal direction and from about 1.5 times to about 4 times in a transverse direction.

18. The coated film of claim 1 wherein the coating composition further comprises both at least one filler and at least one surfactant.

19. A multilayered structure which comprises a polyamide film and a substantially uniform crosslinked polyurethane coating on one side of the polyamide film, the crosslinked polyurethane coating formed with a coating composition comprising at least one water dispersible polyurethane and at least one crosslinker, and a layer of a biologically derived glue on the crosslinked polyurethane coating; which polyamide film has been uniaxially or biaxially stretched after the crosslinked polyurethane coating has been applied on the film; and a layer of paperboard or a polymeric substrate on the other side of the polyamide film.

20. A multilayered structure which comprises a polyamide film and a substantially uniform coating composition on one side of the polyamide film, which coating composition comprises at least one water dispersible polyurethane and at least one crosslinker, which polyamide film has been uniaxially or biaxially stretched after the coating composition has been applied on the film; a layer of a biologically derived glue on the coating composition; and a layer of paperboard or a polymeric substrate on an opposite side of the polyamide film.

21. A method for preparing a coated film which comprises applying a substantially uniform coating composition onto one side of a polyamide film, which coating composition comprises at least one water dispersible polyurethane and at least one crosslinker, crosslinking the polyurethane to provide a crosslinked polyurethane coating; uniaxially or biaxially stretching the film; and applying a layer of a biologically derived glue onto the crosslinked polyurethane coating.

22. The method according to claim 21 wherein the stretching is from about 1.5 times to about 4 times in a longitudinal direction and from about 1.5 times to about 4 times in a transverse direction.

23. The method according to claim 22 further comprising adhering a layer of paperboard or a polymeric substrate onto the other side of the polyamide film.

24. A method for preparing a coated film which comprises applying a substantially uniform precursor coating composition onto one side of a polyamide film, which precursor coating composition comprises at least one water dispersible polyurethane and at least one crosslinker; crosslinking the polyurethane to provide a crosslinked polyurethane coating composition; applying a layer of a biologically derived glue onto the crosslinked polyurethane coating composition and uniaxially or biaxially stretching the film.

* * * * *